US008665112B2

(12) United States Patent
Chen et al.

(10) Patent No.: US 8,665,112 B2
(45) Date of Patent: Mar. 4, 2014

(54) MESSAGE BROADCAST SYSTEM AND METHOD FOR VEHICULAR NETWORK

(75) Inventors: Lien-Wu Chen, Taoyuan County (TW); Yu-Chee Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 122 days.

(21) Appl. No.: 13/454,788

(22) Filed: Apr. 24, 2012

(65) Prior Publication Data

US 2013/0076537 A1 Mar. 28, 2013

(30) Foreign Application Priority Data

Sep. 23, 2011 (TW) ............................ 100134401 A

(51) Int. Cl.
*G08G 1/09* (2006.01)
*G08B 1/08* (2006.01)
*G06F 19/00* (2011.01)

(52) U.S. Cl.
USPC ........... 340/905; 340/901; 340/903; 340/904; 340/539.13; 701/1; 701/117; 701/118; 701/400; 701/414

(58) Field of Classification Search
USPC ........................................................ 340/905
See application file for complete search history.

(56) References Cited

U.S. PATENT DOCUMENTS

| | | | | |
|---|---|---|---|---|
| 6,940,451 | B2 * | 9/2005 | Kanerva | 342/357.31 |
| 7,113,107 | B2 * | 9/2006 | Taylor | 340/901 |
| 2011/0109482 | A1 | 5/2011 | Haran | |
| 2011/0128902 | A1 | 6/2011 | Guo | |

OTHER PUBLICATIONS

Samaneh Khakbaz et al., A Reliable Broadcast Method for Vehicular Ad hoc Networks Considering Fragmentation and Intersection Problems, IEEE Computer Society, 2008, pp. 379-384, The Second International Conference on Next Generation Mobile Applications, Services, and Technologies.

Adnan Nasri et al., A Cross Layered scheme for Broadcasting at Intersections in Vehicular Ad hoc Networks, IEEE Computer Society, 2009, pp. 13-17, International Conference on Future Networks.

Samaneh Khakbaz et al., The Challenge of Broadcasting at Intersections in Vehicular Adhoc Networks, IEEE, 2010, pp. V2-505-V2-509, vol. 2, International Conference on Electronics and Information Engineering.

Jinyoun Cho et al., Fast Broadcast at the Intersection in VANET, 3rd IEEE, 2011, pp. 65-69, Intelligent Vehicular Communications System Workshop.

* cited by examiner

*Primary Examiner* — Donnie Crosland
(74) *Attorney, Agent, or Firm* — Muncy, Geissler, Olds & Lowe, P.C.

(57) ABSTRACT

The present invention provides a message broadcast system and method for vehicular network. The system comprises a positioning device, a transmitting device and a processing device. The positioning device positions a location data of a vehicle. The transmitting device transmits a first packet to a neighbor vehicle. The processing device is coupled to the positioning device and transmitting device. The processing device determines the transmitting device transmits a second packet to the neighbor vehicle when the vehicle is in a section of crossroads. The processing device determines whether the vehicle is in a section of crossroads or a road section according to a third packet periodically transmitted from the neighbor vehicle.

10 Claims, 7 Drawing Sheets

MESSAGE BROADCAST SYSTEM AND METHOD FOR VEHICULAR NETWORK

BACKGROUND OF THE INVENTION (a) Field of the Invention

The invention relates to a system and method, particularly to a message broadcast system and method for saving the number of times in broadcasting.

(b) Description of the Related Art

Flooding is a common message broadcast method in a vehicular network but large network traffic is generated to consume additional wireless bandwidth when the number of vehicles increases in the vehicular network. Thus, Flooding broadcast causes loading on the vehicular network.

Furthermore, the traditional message broadcast system for a vehicular network needs additional memory space to store the map data and does not have a function of determining a crossroads section and a road section.

BRIEF SUMMARY OF THE INVENTION

One object of the invention is to detect existence of a crossroads according to driving directions and location distributions of vehicles at the time and to determine whether or not broadcast is re-executed to further reduce the number of times in message broadcasting.

One object of the invention is to determine whether or not a vehicle is in a section of crossroads without using additional memory space to store the map data.

One embodiment of the invention provides a message broadcast system for a vehicular network. The message broadcast system for a vehicular network comprises a positioning device, a transmitting device and a processing device. The positioning device positions a first location data of a vehicle. The transmitting device executes data transmission with a neighbor vehicle through a first packet. The processing device is coupled to the positioning device and the transmitting device. The processing device determines that the transmitting device transmits a second packet to the neighbor vehicle when the vehicle is in a section of crossroads. The processing device determines whether the vehicle is in a section of crossroads or a road section according to a third packet periodically transmitted from the neighbor vehicle.

Furthermore, one embodiment of the invention provides a message broadcast method for a vehicular network. The method comprises the following steps: a positioning step, acquiring a location data through a positioning system; transmitting a packet to a plurality of vehicles within a signal reachable range; and determining a driving direction and a position distribution of the vehicle according to the packet transmitted by the vehicle.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 1:
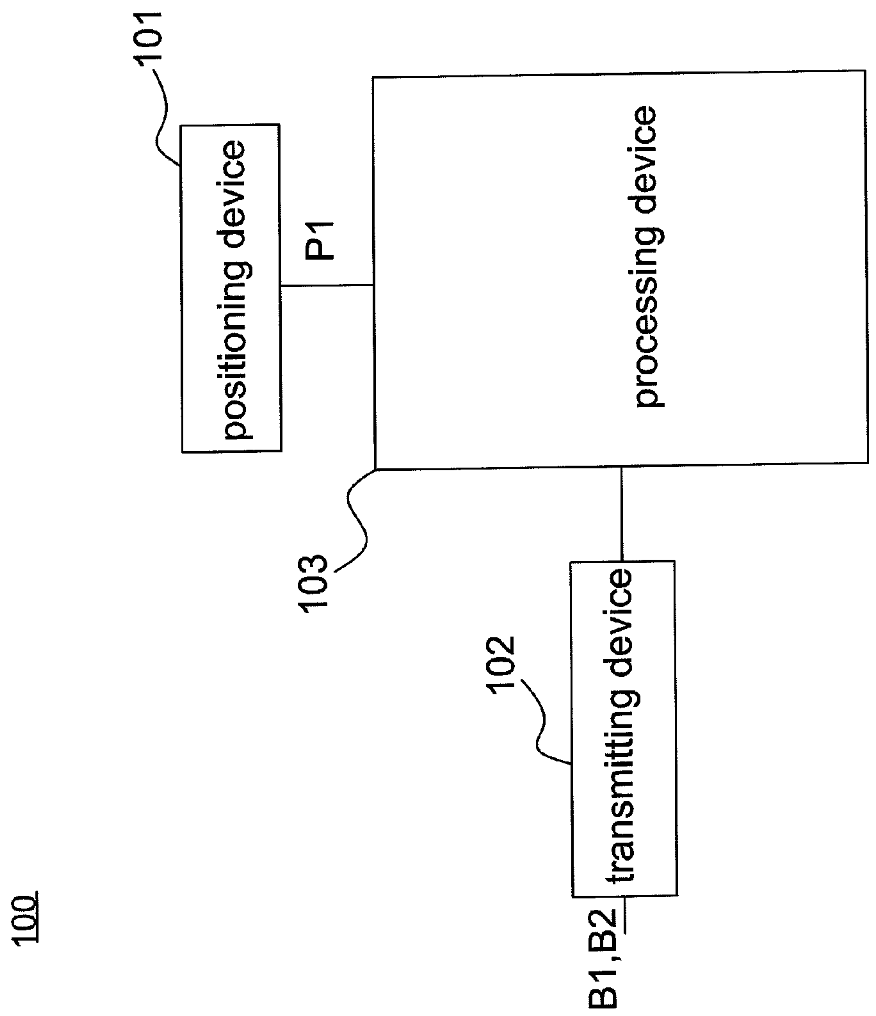
FIG. 1 shows a schematic diagram illustrating a message broadcast system according to one embodiment of the invention.

Please refer to FIG. 1. FIG. 1 shows a schematic diagram illustrating a message broadcast system 100 according to one embodiment of the invention. The message broadcast system 100 is applied in a vehicular network. The message broadcast system 100 comprises a positioning device 101, a transmitting device 102 and a processing device 103.

The positioning device 101 positions a first location data P1 of a vehicle C0. The transmitting device 102 executes data transmission with neighbor vehicles C1~Cn through a packet B1 where n is any positive integer. The processing device 103 is coupled to the positioning device 101 and the transmitting device 102. When the vehicle C0 is in a section of crossroads, the processing device 103 determines that the transmitting device 102 transmits a packet B2 to the vehicles within a transmission range or a signal reachable range. It should be noted that the processing device 103 determines whether the vehicle is in a section of crossroads or a road section according to a periodical packet B0 of C1~Cn.

Besides, the message broadcast system 100 can be disposed in a Smart Phone (e.g., iPhone, Android Phone), a global positioning system (GPS) navigation device, an electronic toll collection (ETC) on-board unit (OBU) or an IWCU (ITRI WAVE/DSRC communication unit) but is not limited to these examples.

Figure 2A:
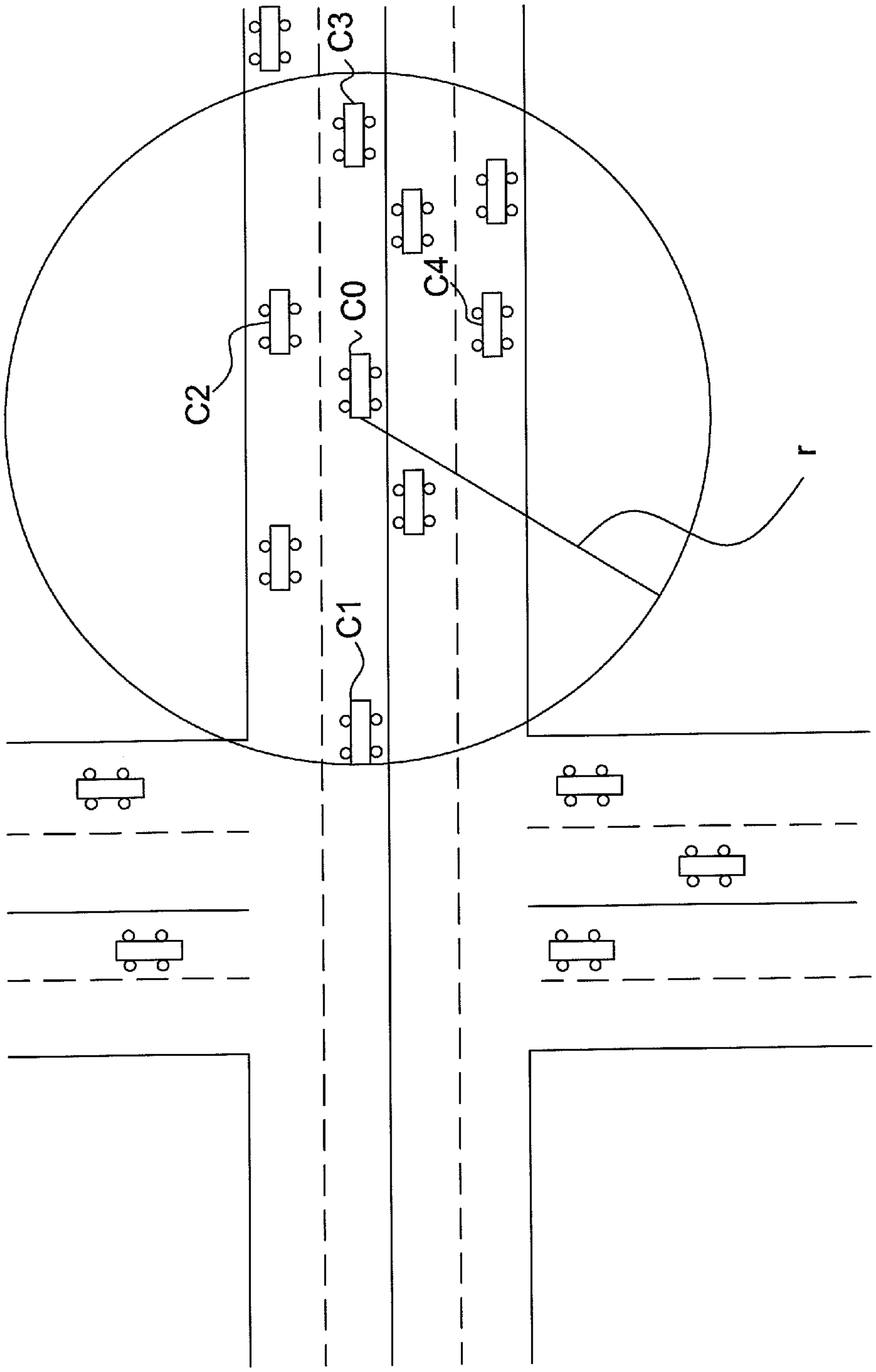
FIG. 2A shows a schematic diagram illustrating a message broadcast method according to one embodiment of the invention.

Please refer to FIG. 2A. FIG. 2A shows a schematic diagram illustrating a message broadcast method according to one embodiment of the invention. On the street W, there are a plurality of vehicles C0~Cn moving on the street. For example, the vehicle C0 obtains a location data P1 through a positioning system such as GPS and transmits a packet B1 to a plurality of vehicles within a signal reachable range. It should be noted that each of the vehicles C0~Cn obtains its own location data from the positioning system such as GPS and all of the vehicles C0~Cn periodically (for example, once per second) transmit the packet B0 to all vehicles within the signal reachable range and the packet B0 comprises the current position and driving direction corresponding to each of the vehicles C0~Cn. The vehicle C0 is aware of the location distribution and the driving direction of the neighbor vehicle from the packet B0 corresponding to the neighbor vehicle. Therefore, when the vehicle C0 receives the packet B1, the vehicle C0 can determine to be in a section of crossroads or not to transmit the packet B2.

It should be noted that, for clarity, this embodiment uses vehicles C1~C4 to demonstrate. The signal reachable range of the vehicle C0 is a circular area having a radius of r and the vehicles C1~C4 are in the signal reachable range. It should be noted that, in the message broadcast method, at first the vehicles C1~C4 determine whether or not to be in a section of crossroads.

Figure 2B:
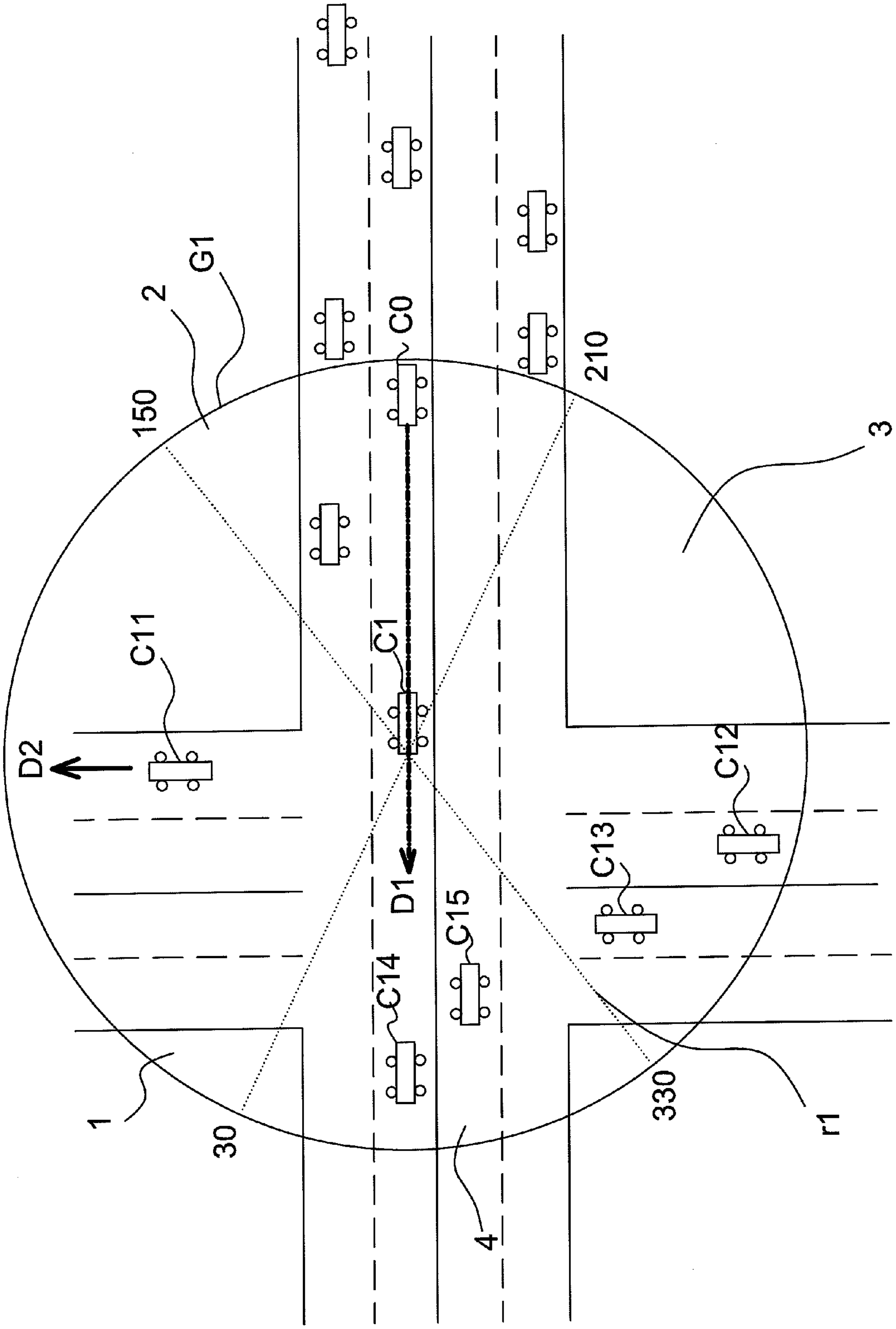
FIG. 2B shows a schematic diagram illustrating a message broadcast method after the vehicle C1 receives the packet B1 according to one embodiment of the invention.

The following describes the message broadcast method after the vehicles C1~C4 receive the packet B1. Please refer to 2B. FIG. 2B shows a schematic diagram illustrating a message broadcast method after the vehicle C1 receives the packet B1 according to one embodiment of the invention and the distribution of the neighbor vehicles of the vehicle C1 is shown in FIG. 2B.

After the vehicle C1 receives the packet B1 from the vehicle C0, the vehicle C1 determines whether to be in a section of crossroads according the location distribution and driving directions of all vehicles C11~C15 within its own signal reachable range. The crossroads section determining step is as follows. The signal reachable range of the vehicle C1 is assumed to be a circular area G1 having a radius of r1. In this embodiment, the circular area G1 is divided into four sectors 1~4. Taking the vehicle C1 as the center, the sector 1 has a central angle from 30 degrees to 150 degrees; the sector 2 has a central angle from 150 degrees to 210 degrees; the sector 3 has a central angle from 210 degrees to 330 degrees; and the sector 4 has a central angle from 330 degrees to 30 degrees.

It should be noted that in this embodiment all vehicles are provided with a GPS positioning device and the location data and driving direction of a vehicle can be obtained from calculation from its own processing device. Thus, when the vehicle C1 moves in a direction D1, the vehicles C11~C13 move in the sector 1 or the sector 3, the vehicles C11~C12 move in a direction D2, and the vehicle C13 moves in a direction opposite to the direction D2, the vehicles are considered to move in a direction perpendicular to that of the vehicle C1. When the vehicle C1 exchanges the packet with the vehicles C11~C15, the vehicle C1 determines that the vehicles C11~C15 are in sectors 1~4. In one embodiment, the vehicle C1 is considered to be in a section of crossroads from the vehicle C11 moving in the sector 1. In another embodiment, the vehicle C1 is considered to be in a section of crossroads from the vehicles C12~C13 moving in the sector 3. In other words, the vehicle C1 further determines that the vehicles C11~C13 move in a direction perpendicular to that of the vehicle C1 according to the vehicles C11~C13 positioned in the sector 1 or 3. Thus, the vehicle C1 is in a section of crossroads. When the vehicle C1 is in a section of crossroads, the message broadcast system of the vehicle C1 transmits the packet B2 to all vehicles within the transmission range. In one embodiment, the packet B2 comprises a license data of a suspicious vehicle.

Figure 2C:
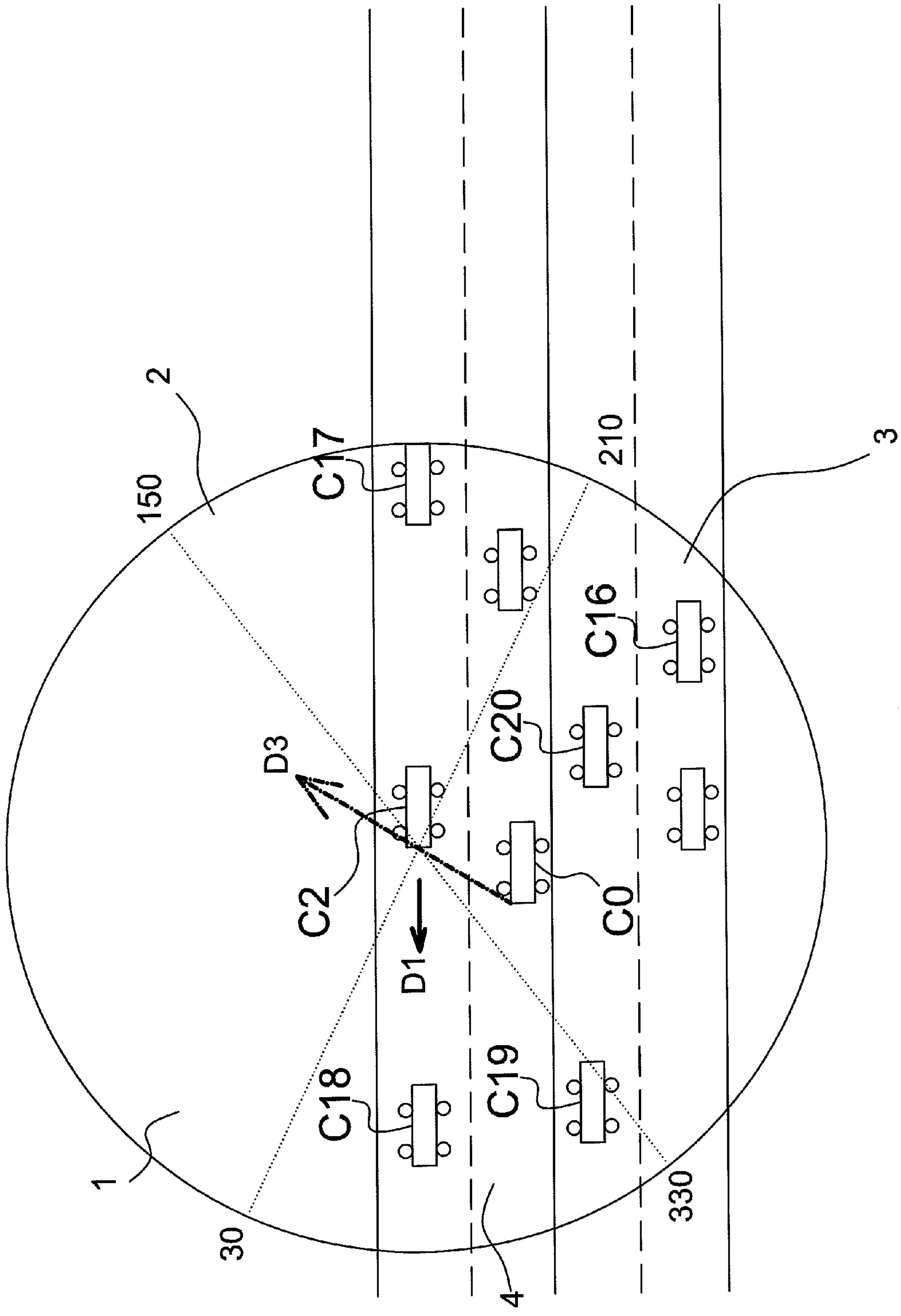
FIG. 2C shows a schematic diagram illustrating a message broadcast method after the vehicle C2 receives the packet B1 according to one embodiment of the invention.

Please refer to FIG. 2C. FIG. 2C shows a schematic diagram illustrating a message broadcast method after the vehicle C2 receives the packet B1 according to one embodiment of the invention and the distribution of the neighbor vehicles of the vehicle C2 is shown in FIG. 2C. Similar to the above description, the vehicle C2 moves in the direction D2. Since the sector 1 of the vehicle C2 has no any vehicle, although the vehicle C16 moves in the sector 3, the driving direction of the vehicle C16 is parallel to the direction D1 and thus the vehicle C2 is in a road section. In this embodiment, the location data of the vehicle C0 and C2 can be obtained from the GPS positioning device and thus the vehicle C2 calculates a direction D3 of the packet B1 transmitted from the vehicle C0 to the vehicle C2. In this embodiment, the direction D3 corresponds to the sector 1 of the vehicle 2 but there is no vehicle in the sector 1. Thus, the vehicle C2 does not re-transmit the packet B2 to all vehicles within the transmission range.

Figure 2D:
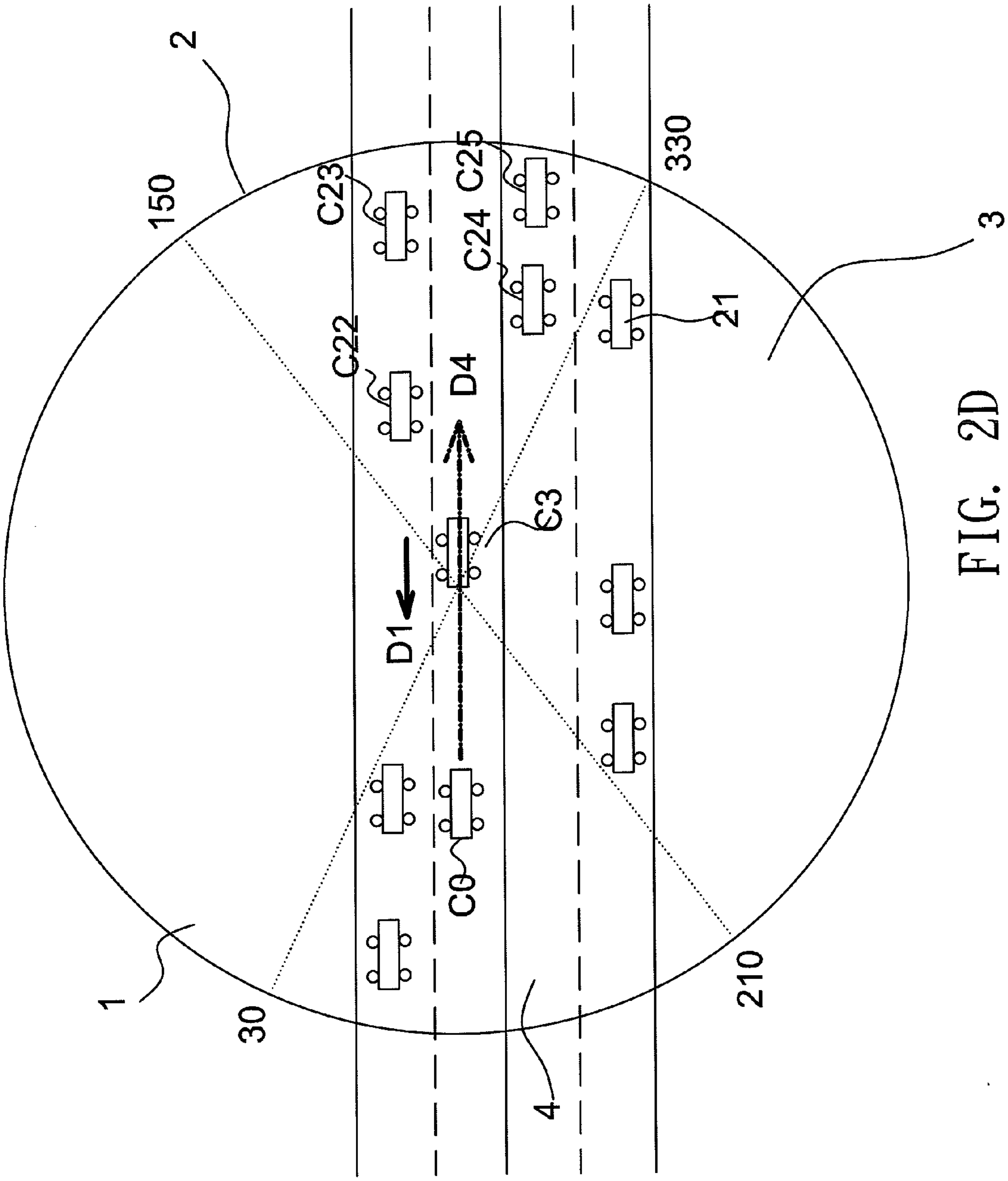
FIG. 2D shows a schematic diagram illustrating a message broadcast method after the vehicle C3 receives the packet B1 according to one embodiment of the invention.

Please refer to FIG. 2D. FIG. 2D shows a schematic diagram illustrating a message broadcast method after the vehicle C3 receives the packet B1 according to one embodiment of the invention and the distribution of the neighbor vehicles of the vehicle C3 is shown in FIG. 2D. Similar to the above description, the vehicle C3 moves in a direction parallel to the direction D1 and there is no vehicle in the sector 1 of the vehicle C3. Although the vehicle C21 is in the sector 3, the driving direction of the vehicle C21 is parallel to that of the vehicle C3 and thus the vehicle C3 is in a road section. Besides, the location data of the vehicle C0 and C3 can be obtained from the GPS positioning device and thus the vehicle C3 calculates a direction D4 of the packet B1 transmitted from the vehicle C0 to the vehicle C3. In this embodiment, the sector 2 corresponds to the direction D4 and thus the vehicle C3 determines whether the vehicles C22~25 in the sector 2 move in the same direction as the vehicle C3 or the opposite direction to the vehicle C3. From the driving directions self-calculated by the positioning devices of the vehicles C22~25, the vehicle C3 knows that it has the same driving direction as the vehicles C22~C23 and has the opposite driving direction to the vehicles C24~C25. Since there are the vehicles C22~C23 moving in the same direction in the sector 2 of the vehicle C3, the vehicle C3 transmits the packet B2 to all vehicles within the transmission range.

Figure 2E:
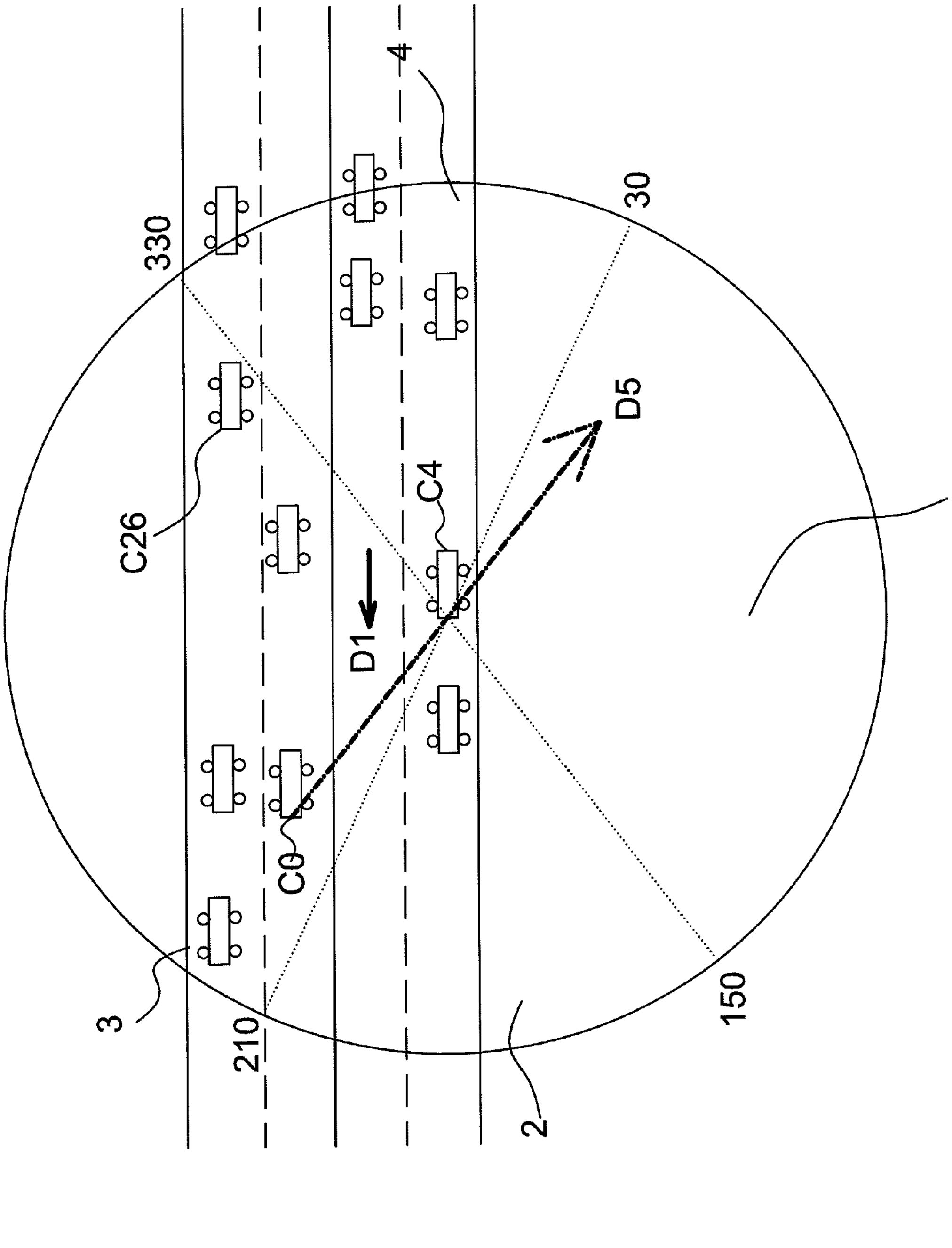
FIG. 2E shows a schematic diagram illustrating a message broadcast method after the vehicle C4 receives the packet B1 according to one embodiment of the invention.

Please refer to FIG. 2E. FIG. 2E shows a schematic diagram illustrating a message broadcast method after the vehicle C4 receives the packet B1 according to one embodiment of the invention. Similar to the above description, since the driving direction of the vehicle C4 is parallel to the direction D1; there is no vehicle in the sector 1 of the vehicle C4; at least one vehicle C26 is in the sector 3; and the driving direction of the vehicle C26 is the same as that of the vehicle C3, the vehicle C3 is in a road section. Besides, the vehicle C3 calculates a direction D5 of the packet B1 transmitted from the vehicle C0 to the vehicle C3. In this embodiment, the sector 1 corresponds to the direction D5, the vehicle C3 determines there is no vehicle in the sector 1 and thus the vehicle C4 does not need to transmit the packet B2 to all vehicles within the transmission range.

Figure 3:
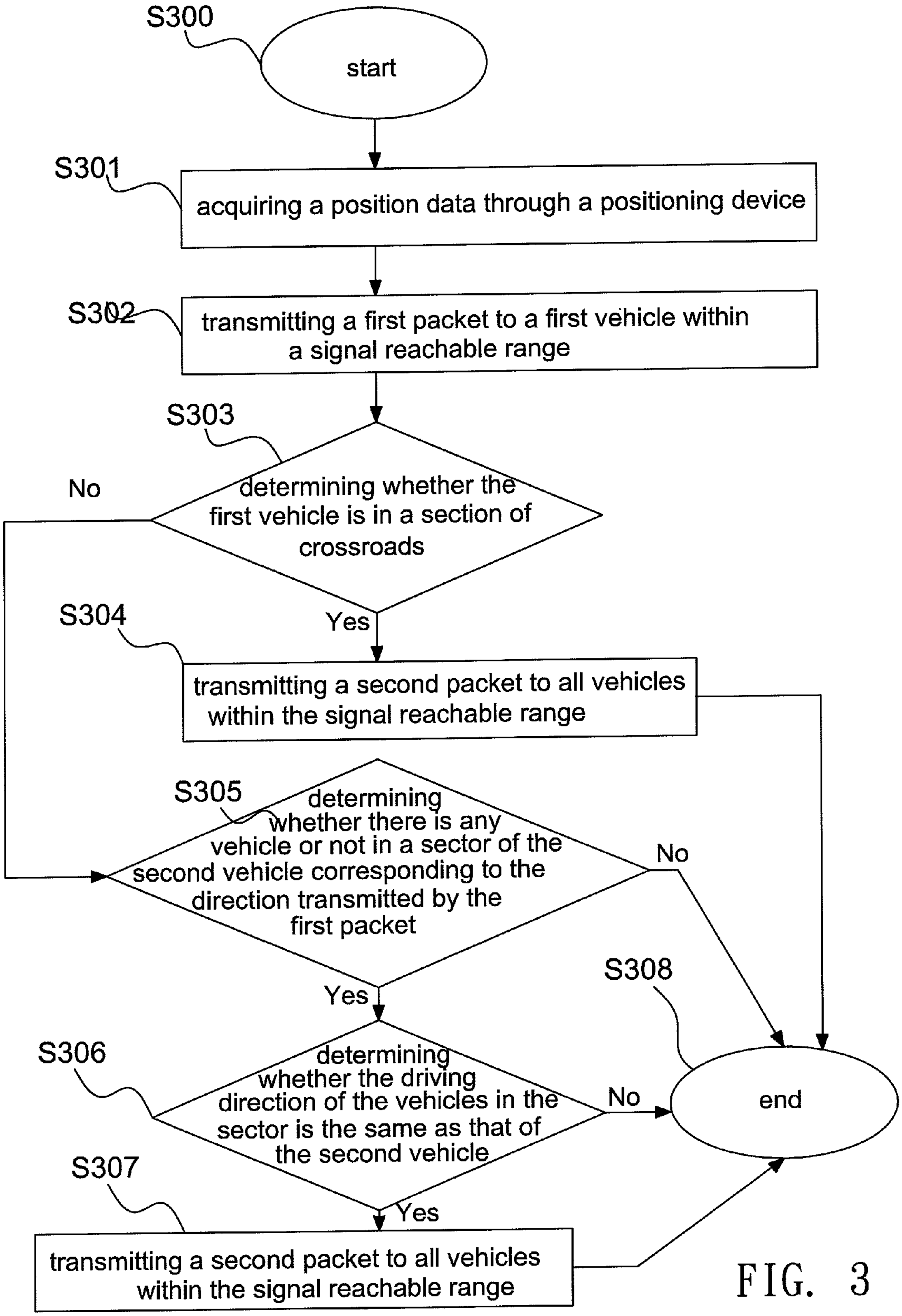
FIG. 3 shows a flow chart illustrating a message broadcast method according to one embodiment of the invention.

Please refer to FIG. 3. FIG. 3 shows a flow chart illustrating a message broadcast method according to one embodiment of the invention. The method comprises the following steps:

Step S300: start;

Step S301: acquiring a position data through a positioning device;

Step S302: transmitting a first packet to a first vehicle within a signal reachable range;

Step S303: determining whether the first vehicle is in a section of crossroads or not, according to a driving direction of a second vehicle near the first vehicle; jumping to step S304 if yes; and jumping to step S305 if not;

Step S304: transmitting a second packet to all vehicles within the signal reachable range;

Step S305: determining whether there is any vehicle or not in a sector of the second vehicle corresponding to the direction transmitted by the first packet; jumping to step S306 if yes; and jumping to step S308 if not;

Step S306: determining whether the driving direction of the vehicles in the sector is the same as that of the second vehicle; jumping to step S307 if yes; and jumping to step S308 if not;

Step S307: transmitting a second packet to all vehicles within the signal reachable range;

Step S308: end.

In conclusion, the present invention designs a message broadcast system and method to effectively reduce the number of times in unnecessary broadcasting, reduce the collision probability of message transmission and increase usage efficiency of wireless bandwidth.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A message broadcast system for a vehicular network, comprising:

a positioning device, positioning a vehicle to acquire a first location data;

a transmitting device, executing data transmission with a neighbor vehicle through a first packet; and a processing device, coupled to the positioning device and the transmitting device;

wherein the processing device determines that the transmitting device transmits a second packet to the neighbor vehicle when the vehicle is in a section of crossroads; and the processing device determines whether the vehicle is in a section of crossroads or a road section according to a third packet periodically transmitted from the neighbor vehicle.

2. The system according to claim 1, wherein the third packet comprises a second location data of the neighbor vehicle and the processing device determines whether the vehicle is in a section of crossroads or a road section according to the first location data and the second location data.

3. The system according to claim 2, wherein the processing device determines whether the vehicle and the neighbor vehicle are driven in the same direction according to the first location data and the second location data, when the vehicle is in a road section; when the processing device determines that the vehicle and the neighbor vehicle are driven in the same direction, the vehicle retransmits the second packet to the neighbor vehicle.

4. The system according to claim 1, wherein the system is disposed in a Smart Phone, a global positioning system (GPS) navigation device, an electronic toll collection (ETC) onboard unit (OBU) or an IWCU (ITRI WAVE/DSRC communication unit).

5. A message broadcast method for a vehicular network, comprising:

a positioning step, acquiring a location data through a positioning system;

transmitting a first packet to a first vehicle within a signal reachable range; and a crossroads section determining step to determine whether the first vehicle is in a section of crossroads or not according to a driving direction of a second vehicle near the first vehicle;

wherein the location data comprises a driving direction corresponding to the first vehicle and the first packet comprises the location data.

6. The method according to claim 5, further comprising:

transmitting a second packet to all vehicles within the signal reachable range by the first vehicle, when the first vehicle is in a section of crossroads.

7. The method according to claim 6, wherein the crossroads section determining step further comprises:

determining that the first vehicle is in a section of crossroads, when the driving direction of the second vehicle is perpendicular to that of the first vehicle.

8. The method according to claim 7, wherein the method comprises the following steps:

using the first vehicle as a center and the signal reachable range as a radius to generate a circle, when the first vehicle is not in a section of crossroads;

calculating a first direction transmitted by the first packet according to the location data corresponding to the first vehicle and the second vehicle; and determining whether or not there is a third vehicle in a sector of the circle corresponding to the first direction;

wherein the second vehicle does not retransmit the second packet to the third vehicle if there is a third vehicle in the sector and the third vehicle and the second vehicle are driven in opposite directions; the second vehicle retransmits the second packet to the third vehicle if there is a third vehicle in the sector and the third vehicle and the second vehicle are driven in the same direction.

9. The method according to claim 8, wherein the method comprises the following step:

the second vehicle does not retransmit the second packet to the third vehicle if there is no vehicle in the sector.

10. The method according to claim 5, wherein the method further comprises the following step:

periodically transmitting a third packet to acquire location distributions and driving directions of all vehicles within the signal reachable range.

* * * * *